United States Patent [19]

Neubauer

[11] 4,094,438

[45] June 13, 1978

[54] METHOD OF DISPENSING LABELS

[75] Inventor: Gilbert A. Neubauer, Centerville, Ohio

[73] Assignee: Monarch Marking Systems, Inc., Dayton, Ohio

[21] Appl. No.: 786,312

[22] Filed: Apr. 11, 1977

Related U.S. Application Data

[62] Division of Ser. No. 604,290, Aug. 13, 1975, abandoned.

[51] Int. Cl.[2] .................... B32B 3/10

[52] U.S. Cl. .................... 221/1; 221/71

[58] Field of Search .................... 221/1, 71, 70; 226/53; 428/42; 282/20 R; 156/250

[56] References Cited

U.S. PATENT DOCUMENTS

| | | | |
|---|---|---|---|
| 2,259,358 | 10/1941 | Templeton | 282/20 R |
| 3,783,083 | 1/1974 | Jenkins | 428/42 |

*Primary Examiner*—Stanley H. Tollberg

*Attorney, Agent, or Firm*—Joseph J. Grass

[57] ABSTRACT

There is disclosed a composite web of labels in a supply roll, method of making a label roll and method of dispensing labels. The composite web has a web of supporting material and labels releasably adhered to the supporting material web. There are groups of slits in the supporting material web and in the labels at longitudinally spaced apart locations. The slits are shown to be in a generally Y-shaped configuration. Each group has a generally longitudinally extending slit and two slits disposed at an angle with respect to the transverse direction across the web. The two slits extend at an angle to the transverse direction from a generally V-shaped flap or flap portion. The slits were shown to be spaced apart by a land or frangible portion. The labels are dispensed from the roll by drawing the web about a delaminator in a direction that the flap portions trail across the delaminator. A toothed driver engages the web downstream of the delaminator and enters the longitudinal slit at a position upstream of the flap portion, severs the frangible portion and folds the flap portion out of the plane of the web.

6 Claims, 13 Drawing Figures

FIG-1
FIG-4
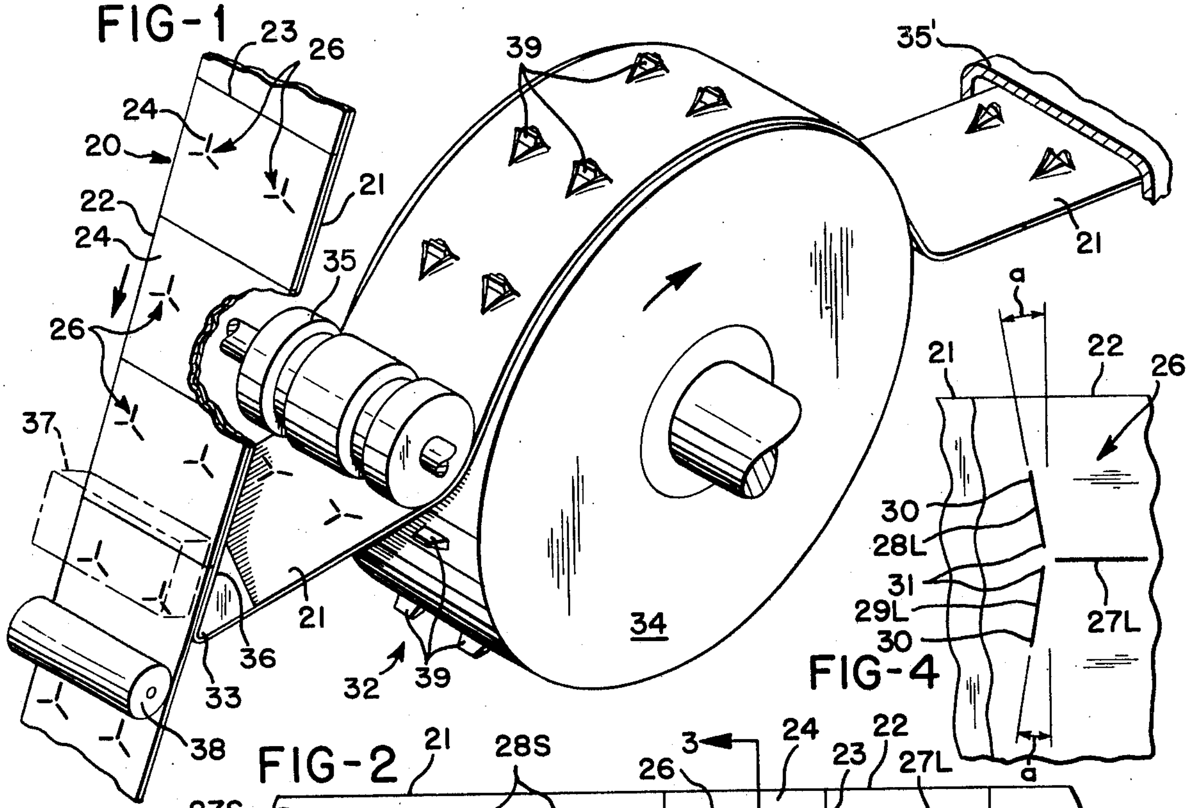
FIG-2
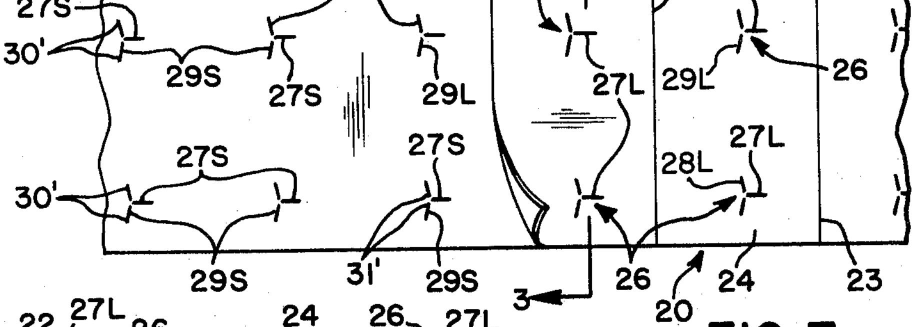
FIG-3
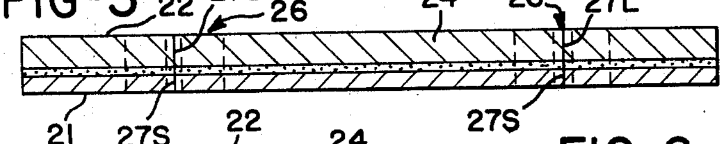
FIG-7
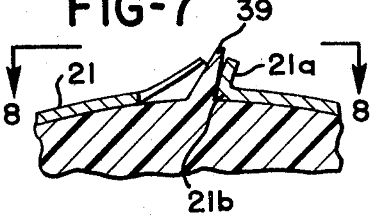
FIG-5
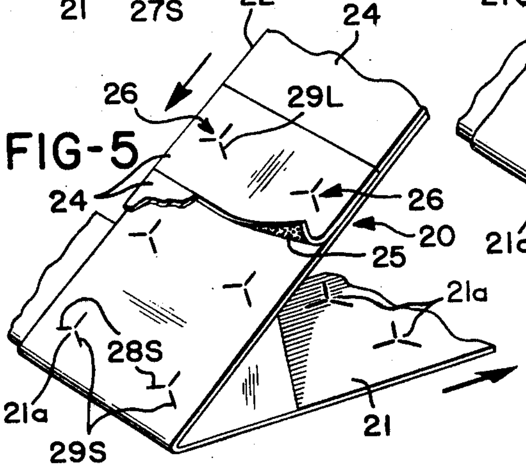
FIG-6
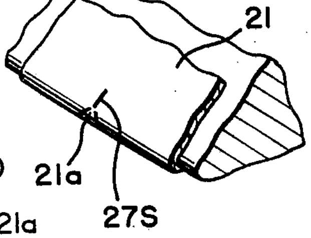
FIG-8
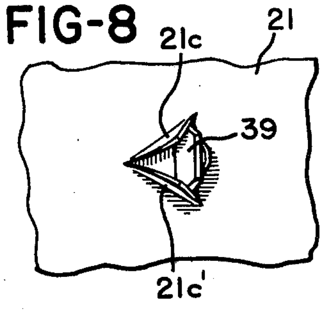

FIG-12
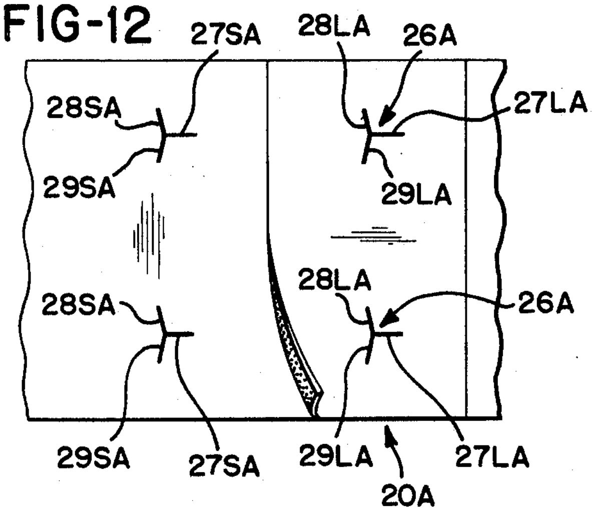
FIG-11
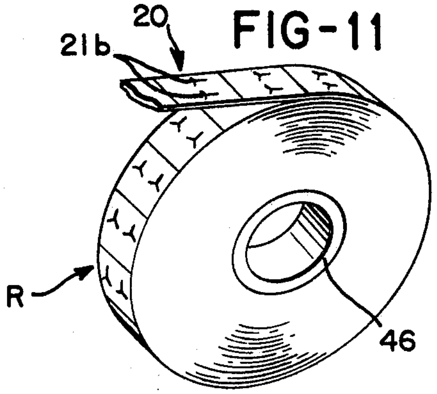
FIG-9
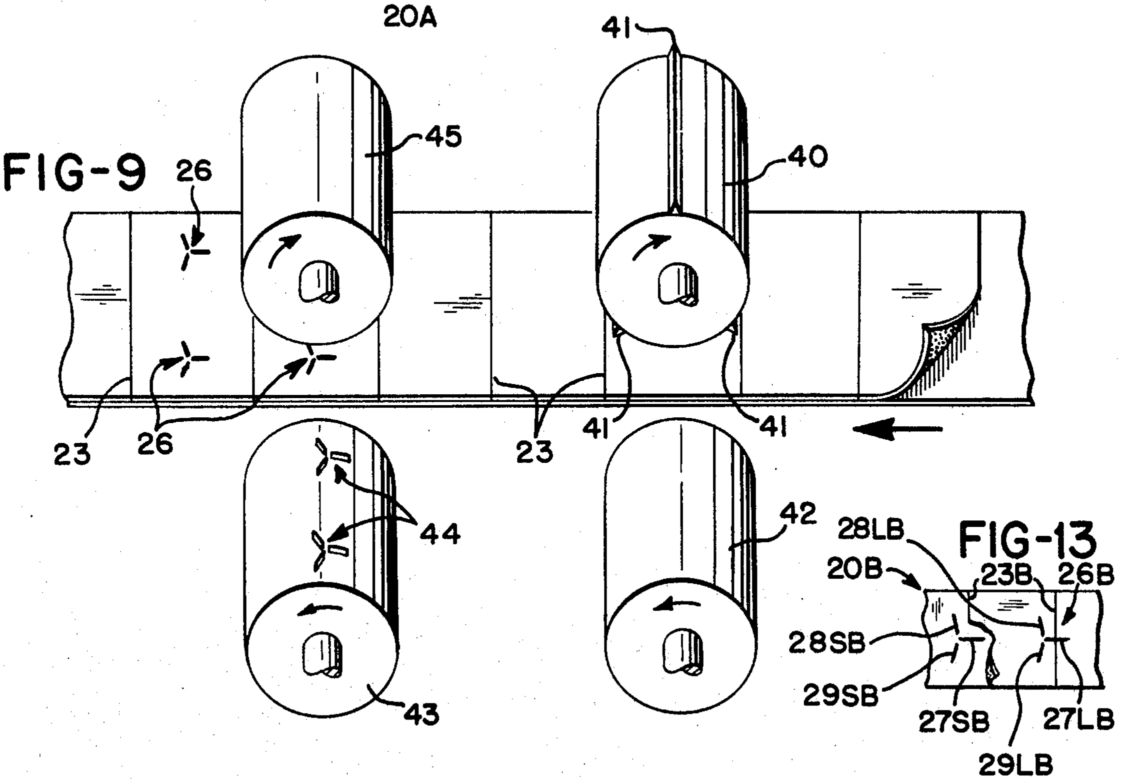
FIG-13
FIG-10
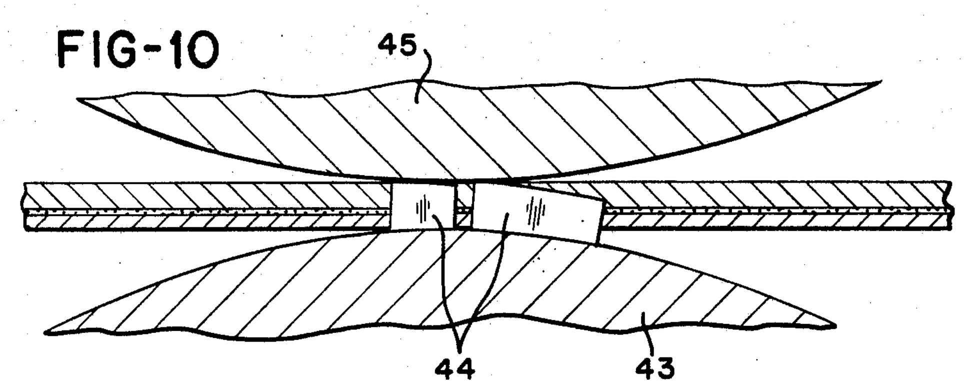

METHOD OF DISPENSING LABELS

CROSS-REFERENCE TO RELATED APPLICATION

This is a division of application Ser. No. 604,290, filed Aug. 13, 1975, now abandoned.

BACKGROUND OF THE INVENTION

1. Field of the Invention

This invention relates to the art of composite webs of pressure sensitive labels, method of making composite label webs and method of dispensing labels.

2. Brief Description of the Prior Art

U.S. Pat. No. 3,783,083 to W. A. Jenkins, granted Jan. 1, 1974, discloses composite webs of pressure sensitive labels and methods of making and dispensing such labels. In one of the embodiments groups of cuts are made in both the supporting material and in the label material at longitudinally spaced apart locations. The group of cuts make generally V-shaped or triangular-shaped flaps or flap portions in the supporting material web. The web is drawn about a delaminator in a direction so that the flaps trail about the delaminator at which the labels are successively dispensed. The integrity of the web is maintained by a frangible portion at the top of the V of the flap. In feeding the web a tooth of a driver first severs the respective frangible portion and thereafter folds the flap out of the plane of the web. U.S. Pat. No. 3,501,365 to E. C. Marshall discloses cuts in the supporting material web which can be circular, rectangular or square so long as the web is fed in a direction in which a defined feed edge formed at a cut is engaged by a tooth of a toothed driver. U.S. Pat. Nos. 2,259,358 to R. P. Templeton granted Oct. 14, 1941 relates to a manifolding strip having Y, X and + shaped cuts.

SUMMARY OF THE INVENTION

A composite label web according to the invention includes an elongated web of supporting material, label material, and pressure sensitive adhesive on the label material releasably securing the label material to the supporting material web. The label material is divided into labels and there are groups of bar cuts or slits through the supporting material web and preferably at least partially through the label material. The improvement comprises that each group of slits has slit means defining a flap portion extending in an upstream trailing direction in the supporting material web away from the leading end of the web toward the trailing end of the supporting material web and a slit disposed adjacent the slit means and extending away from the slit means in generally the trailing direction. Each slit means includes one or more slits which define such a flap or flap portion.

According to a specific embodiment each group of slits has at least three slits in a generally Y-shaped configuration. One of the slits of each group extends generally longitudinally and two slits of each group extend at an angle with respect to the transverse direction across the web. It is preferred that the converging adjacent ends of the slits are separated by a frangible portion. It is also preferred that the groups of cuts extend at least partially through and most preferably completely through the label material, as well as completely through the supporting material web.

According to the present improvement, the flap portions trail across the delaminator with no tendency of the flap portions to fold out of the plane of the web, and yet the respective slits provide easy entry for a tooth of a toothed driver so that after entry of the tooth the respective flap portion is folded out of the plane of the web and the tooth engages the web at the flap portion and at the fold line for the flap portion. The provision of the flap portion results in a reinforced edge. According to the preferred construction in which a frangible portion is provided between the slits of each group, the tooth can enter the web before being required to sever the frangible portion. This enhances the ease with which the severable portion can be severed. It is also preferred to have the angle made by the two slits relatively shallow preferably less than about 45° and most preferably between about 5° and about 15°.

The invention also includes method of making a composite label roll and method of dispensing labels, as characterized above.

BRIEF DESCRIPTION OF THE DRAWINGS

FIG. 1 is a perspective view of a composite web according to one embodiment of the invention, being fed in a dispensing apparatus to successively dispense labels from the supporting material web;

FIG. 2 is a top plan view of the composite web shown in FIG. 1;

FIG. 3 is an enlarged sectional view taken generally along line 3—3 of FIG. 2;

FIG. 4 is an enlarged fragmentary top plan view of the composite web shown in FIGS. 1 through 3;

FIG. 5 is a perspective view with labels broken away and showing the composite web traveling toward the delaminator;

FIG. 6 is a fragmentary perspective view showing the flap portion of the supporting material web passing about the delaminator;

FIG. 7 is a sectional view through the toothed driver showing a tooth engaged with the flap portion and acting on the supporting material web at the fold line;

FIG. 8 is a view taken along line 8—8 of FIG. 7;

FIG. 9 is a diagrammatic exploded view showing the manner in which slits in the composite web according to the embodiments of FIGS. 1 through 11 are made;

FIG. 10 is a sectional view showing the cutter cutting through the composite label web to make the groups of cuts or slits;

FIG. 11 is a perspective view of the composite web shown wound into a roll;

FIG. 12 is a top plan view of a composite web in accordance with another embodiment of the invention; and FIG. 13 is a fragmentary top plan view of yet another embodiment of the composite web of the invention.

DETAILED DESCRIPTION OF THE PREFERRED EMBODIMENT

Referring to the embodiment of FIGS. 1 through 11, there is shown a composite web generally indicated at 20. The composite web 20 includes a web of supporting material or carrier strip 21 and a web of label material 22. Transverse "butt cuts" 23 divide the label material 22 into a series of labels 24. Pressure sensitive adhesive 25 (FIG. 5) on the label material 22 releasably secures or adheres the label material to the supporting material web 21. It is conventional to coat the upper surface of the web 21 with a coating of a release material (not shown) so that the pressure sensitive adhesive adheres only lightly to the release coating.

With reference to FIG. 2, for example, the composite web 20 is shown to have groups of bar cuts or slits generally indicated at 26 which are shown to extend through both the supporting material web 21 and the label material 22. Each group 26 includes slits or bar cuts 27S, 28S and 29S in the supporting material web 21 and respective aligned slits or bar cuts 27L, 28L and 29L in the label material 22. The slits of each group 26 are in a generally Y-shaped configuration. The slits 27L and 27S extend longitudinally and the slits 28L, 28S, 29L and 29S extend at angles *a* relative to the transverse direction across the web 20. Both angles *a* are preferably equal and the lengths of the slits 28L, 28S, 29L and 29S are preferably equal. As best shown in FIG. 4, the leading ends 30 of slits 28L and 29L of each group 26 are in alignment transversely across the web 20 and also the trailing ends 31 of the slits 28L and 29L of each group 26 are in alignment transversely across the web. The same applies to respective leading and trailing ends 30' and 31' of slits 28S and 29S.

In use in a label dispensing and applying apparatus generally indicated at 32 in FIG. 1, there is provided a delaminator 33, a feed wheel 34, a roller 35, a stripper (not shown) for stripping the web 21 from the feed wheel 34, and guide structure 35'. The delaminator 33 conventionally takes the form of a relatively flat peel plate or small diameter roller which in some apparatus allows the supporting material web to make a relatively sharp bend through as much as about 180°. As the web 21 passes around the delaminator 33 the labels are successively stripped or delaminated from the web. As illustrated, a platen 36 supports the labels as a relatively movable print head 37 (shown by means of phantom lines) cooperates with the platen 36. An applicator 38 typically in the form of a roller, but other devices such as belts and presser feet can be used, is positioned downstream of the delaminator adjacent the delaminator 33 so that the just printed label can be applied by applicator 38.

The labels 24 which are carried by the web 21 are advanced to the platen 36 and to the delaminator oriented in a direction that the leading ends 30 and 30' of respective cuts 28L, 29L and 28S and 29S arrive at the delaminator 33 ahead of the trailing ends 31 and 31' so that flap portions **21*a*** trail, as shown in the drawings.

In FIGS. 5 and 6, the angles that the slits 28L, 29L, 28S and 29S make with the transverse direction across the web is considerably exaggerated from the angles as shown in FIGS. 2 and 4 for example for the sake of clarity of illustration. It is apparent that as the web 21 passes about the delaminator 33, the slits 28S and 29S do not open up even slightly which would cause the web to be stressed at ends 30' or 31'. When the web 21 has passed the delaminator 33, the web 21 can be engaged by the toothed driver 34 which preferably has a plurality of teeth 39. In that the web has two groups 26 of cuts extending transversely across the web, the feed wheel 34 has two rows of teeth 39. It is within the purview of the invention to have a single group 26 of cuts per label with relatively smaller labels, in which event only one row of teeth would be used as in the embodiment of FIG. 13. As the toothed driver 34 is driven (clockwise as shown in FIG. 1), the teeth 39 engage the web 21 at the longitudinal slits 27S which allows easy entry for the respective tooth 39. Upon continued rotation of the driver 34, the tooth 39 ruptures or severs the frangible portion and folds flap portion **21*a* out of the plane of the web 21 as best shwon in FIGS. 7 and 8. Flap portions 21*c* and 21*c'* are also thereby folded out of the plane of the web 21. Each tooth 39 has a slight rake which helps cam the fold line 21*b* against the base or root of the tooth 39 as illustrated in FIG. 7. The fold line 21*b*** thus provides a reinforced edge.

FIG. 9 shows diagrammatically the manner in which the composite web 20 is connected into labels 24 having groups 26 of slits. The composite web 20 passes between a cutting roll 40 having straight knives 41 and a back-up roll 42 to make the butt cuts 23. A roll 43 having sets of knives 44 cooperates with a back-up roll 45. The knives 44 are in a generally Y-shaped configuration. After the web 20 has been converted as shown in FIG. 9, the web is wound into a roll R and typically onto a core 46. The web 20 is wound into the form of a roll R in a direction such that flap portions **21*a* extend in the trailing direction, that is, away from the leading or free end of the roll R and toward the trailing end of the roll R which is adjacent or anchored to the core 46**.

In the embodiment of FIG. 12, the composite web 20A is identical in all respects to the composite web 20 both as to construction, relationships and its orientation of winding onto the core 46 of the label roll R, except that there is no frangible portion in the groups 26A of slits as in the other preferred embodiments. Instead, aligned slits 27LA, 28LA, 29LA, 27SA, 28SA and 29SA are not only adjacent but are joined to each other as shown. Thus, trailing ends of the slits 28LA and 29LA and 28SA join the leading ends of respective cuts 27LA and 27SA.

The embodiments of FIG. 13 is identical to the embodiment of FIGS. 1 through 11, except that a narrower web 20B is provided, that there is only one longitudinally extending row or series of groups 26B of slits and that the butt cuts 23B intersect the respective slits 27LB between the leading and trailing ends of the slits 27LB. The Y-shaped configuration in the embodiment of FIG. 13 can also be made by having the slits 27LB, 28LB and 29LB and the respective aligned slits 27SB, 28SB and 29SB join each other as in the embodiment of FIG. 12.

By way of example, not limitation, the angles *a* of slits 28L, 28S, 29L and 29S are about 10° with respect to the transverse direction across the web 20, the slits 27L and 27S are each about 2.9 millimeters long and the slits 28L, 28S, 29L and 29S are each about 2.4 millimeters long, the angles of the slits 28LA, 28SA, 29LS and 29SA are about 10° with respect to the transverse direction across the composite web 20A, the slits 27LA and 27LB are each about 2.9 millimeters long and the slits 28LA, 28SA, 29LA and 29SA are each about 2.5 millimeters long, and the angles of the slits 28LB, 28SB, 29LB and 29SB are about 10° with respect to the transverse direction across composite web 20B, the slits 27LB and 27SB are each about 2.9 millimeters long, and the slits 28LB, 28SB, 29LB are each about 2.4 millimeters long.

Although the slits 28L, 28S, 29L, 29S, 28LA, 28SA, 29LA, 29SA, 28LB, 28SB, 29LB and 29SB are shown to be straight as is preferred, the invention is not limited to these cuts being straight in that they can be curved. The slits 27L, 27S, 27LA, 27SA, 27LB and 27SB are each shown to be straight and to extend longitudinally, the invention is not limited to these cuts being straight or to the pure longitudinal direction.

The slits in the label material 22 render the labels 24, 24A and 24B more difficult to remove when applied to merchandise. The slits in the supporting material web as well as the aligned slits in the label material in the above disclosed embodiments enable the web to be threaded through the dispensing apparatus 32 during loading without removing any labels from the supporting material web. This is due to the fact that the teeth 39 can inherently poke through both the supporting material web 21 and the label material at the groups 26 of slits. The same is also true in the composite web embodiments of above-mentioned U.S. Pat. No. 3,783,083. However, the invention is not to be considered limited to composite webs in which the cuts 26, 26A or 26B are either partially or entirely through the label material. The slits in the supporting material according to the invention in and of themselves result in an improvement over the prior art.

Other embodiments and modifications of this invention will suggest themselves to those skilled in the art, and all such of these as come within the spirit of this invention are included within its scope as best defined by the appended claims.

I claim:

1. Method of dispensing labels, comprising the steps of: providing a plurality of labels releasably secured by pressure sensitive adhesive to a longitudinally extending web of supporting material, the web having cut means disposed at longitudinally spaced apart locations, each cut means including three slits arranged in a generally Y-shaped configuration and spaced apart by a frangible portion, each slit of the cut means being inclined with respect to the transverse direction across the web, one of the slits of each cut means extending generally longitudinally, each spaced apart cut means forming a respective generally V-shaped flap portion extending initially in the plane of the web, causing the web to undergo a sharp change in direction at a delaminating zone where labels are successively delaminated from the web, the web being oriented such that the flap portions extend in the upstream direction as the web travels toward the delaminating zone, bringing a driver having a plurality of teeth into contact with the web downstream of the delaminating zone to cause each tooth to press against portions of the web adjacent the respective slit to fold said adjacent web portions out of the plane of the web, to open a hole in the web, to sever the respective frangible portion and to fold the respective flap portion out of the plane of the web about a respective fold line and to drivingly engage the flap portion, and pulling on the delaminated part of the web by advancing the toothed driver to effect label delamination at the delaminating zone.

2. Method as defined in claim 1, wherein the slits forming the leading part of the Y are made at angles of less than about 45° with respect to the transverse direction across the web.

3. Method of dispensing labels, comprising the steps of: providing a plurality of labels releasably secured by pressure sensitive adhesive to a longitudinally extending web of supporting material, the web and the labels being wound into a roll, the web having cut means disposed at longitudinally spaced apart locations, each cut means including three slits arranged in a generally Y-shaped configuration, each slit of the cut means being inclined with respect to the transverse direction across the web, one of the slits of each cut means extending generally longitudinally, each cut means forming a respective generally V-shaped flap portion extending initially in the plane of the web, causing the web to undergo a sharp change in direction at a delaminating zone where labels are successively delaminated from the web, the web being oriented such that the flap portions extend in the upstream direction as the web travels toward the delaminating zone, bringing a driver having a plurality of teeth into contact with the web downstream of the delaminating zone to cause each tooth to press against portions of the web adjacent the respective slit to fold said adjacent web portions out of the plane of the web to open a hole in the web, to fold the respective flap portion out of the plane of the web about the respective fold line and to drivingly engage the flap portion, and pulling on the delaminated part of the web by advancing the toothed driver to unwind the web from the roll and to effect label delamination at the delaminating zone.

4. Method as defined in claim 3, wherein the slits forming the leading part of the Y are made at angles of less than about 45° with respect to the transverse direction across the web.

5. Method of dispensing labels, comprising the steps of: providing a plurality of labels releasably secured by pressure sensitive adhesive to a longitudinally extending web of supporting material, the web having groups of slits disposed at longitudinally spaced apart locations, each group including slit means defining a flap portion extending in a trailing direction in the web away from the leading end of the web toward the trailing end of the web and a slit disposed adjacent the slit means and extending away from the slit means in generally the trailing direction, each slit being spaced from the respective slit means to define a frangible portion, causing the web to undergo a sharp change in direction at a delaminating zone where labels are successively delaminated from the web, the web being oriented such that the flap portions extend in the upstream direction as the web travels toward the delaminating zone, bringing a driver having a plurality of teeth into contact with the web downstream of the delaminating zone to cause each tooth to press against portions of the web adjacent the respective slit to fold said adjacent web portions out of the plane of the web to open a hole in the web, to sever the respective frangible portion, to fold the respective flap portion out of the plane of the web about a respective fold line and to drivingly engage the flap portion, and pulling on the delaminated part of the web by advancing the toothed driver to effect label delamination at the delaminating zone.

6. Method of dispensing labels, comprising the steps of: providing a plurality of labels releasably secured by pressure sensitive adhesive to a longitudinally extending web of supporting material, the web and the labels being wound into a roll, the web having groups of slits disposed at longitudinally spaced apart locations, each group including slit means defining a flap portion extending in an upstream trailing direction in the web away from the leading end of the web toward the trailing end of the web and a slit disposed adjacent the slit means and extending away from the slit means in generally the trailing direction, causing the web to undergo a sharp change in direction at a delaminating zone where labels are successively delaminated from the web, the web being oriented such that the flap portions extend in the upstream direction as the web travels toward the delaminating zone, bringing a driver having a plurality of teeth into contact with the web downstream of the delaminating zone to cause each tooth to press against portions of the web adjacent the respective slit to fold said adjacent web portions out of the plane of the web to open a hole in the web, to fold the respective flap portion out of the plane of the web about the respective fold line and to drivingly engage the flap portion, and pulling on the delaminated part of the web by advancing the toothed driver to unwind the web from the roll and to effect label delamination at the delaminating zone.

* * * * *